United States Patent
Hall

(10) Patent No.: US 9,803,651 B2
(45) Date of Patent: Oct. 31, 2017

(54) TURBOCHARGER COMPRESSOR COVER WITH CONVERTIBLE OUTLET CONNECTION

(71) Applicant: Bullseye Power, LLC, Muskegon, MI (US)

(72) Inventor: David M. Hall, Muskegon, MI (US)

(73) Assignee: Bullseye Power, LLC, Muskegon, MI (US)

( * ) Notice: Subject to any disclaimer, the term of this patent is extended or adjusted under 35 U.S.C. 154(b) by 368 days.

(21) Appl. No.: 14/590,146

(22) Filed: Jan. 6, 2015

(65) Prior Publication Data
US 2016/0195105 A1 Jul. 7, 2016

(51) Int. Cl.
*F02B 33/44* (2006.01)
*F02B 39/00* (2006.01)
*F02M 35/10* (2006.01)
*F04D 29/42* (2006.01)

(52) U.S. Cl.
CPC .......... *F04D 29/4206* (2013.01); *F02B 33/44* (2013.01); *F02B 39/00* (2013.01); *F02M 35/10144* (2013.01); *F02M 35/10157* (2013.01); *F05D 2220/40* (2013.01); *Y02T 10/144* (2013.01)

(58) Field of Classification Search
CPC .......................... F02B 39/00; F02M 35/10144
USPC ............................ 285/12, 406, 414, 252, 253
See application file for complete search history.

(56) References Cited

U.S. PATENT DOCUMENTS

| 1,187,321 | A | * | 6/1916 | Hewitt | F16L 47/24 285/12 |
|---|---|---|---|---|---|
| 1,515,750 | A | * | 11/1924 | Pasman | F16L 25/14 285/12 |
| 1,820,020 | A | * | 8/1931 | Hewitt | F16L 19/0206 285/12 |
| 3,731,954 | A | * | 5/1973 | Haglund | F16L 23/02 285/12 |
| 5,195,788 | A | * | 3/1993 | Oetiker | B21D 39/046 285/252 |
| 5,492,373 | A | * | 2/1996 | Smith | F16L 23/024 285/12 |
| 7,469,689 | B1 | * | 12/2008 | Jones | F02B 39/00 123/559.1 |
| 8,419,359 | B2 | * | 4/2013 | Cvjeticanin | B29C 45/14467 415/200 |
| 9,482,240 | B2 | * | 11/2016 | Gerard | F04D 1/00 |
| 2012/0292900 | A1 | * | 11/2012 | Bobenhausen | F16L 33/22 285/336 |

FOREIGN PATENT DOCUMENTS

JP            58119927 A  *  7/1983  ............ B21D 53/36

* cited by examiner

*Primary Examiner* — Mary A Davis
(74) *Attorney, Agent, or Firm* — Butzel Long

(57) ABSTRACT

A turbocharger housing includes a discharge outlet having a tubular configuration that extends tangentially from a peripheral portion of the housing and an externally threaded section adjacent the end of the discharge outlet to allow the discharge outlet to be connected either to a hose by a hose clamp or to a flanged pipe via an internally threaded flange engaging the externally threaded section of the discharge outlet and a V-band clamp securing the flanges together.

6 Claims, 5 Drawing Sheets

TURBOCHARGER COMPRESSOR COVER WITH CONVERTIBLE OUTLET CONNECTION

CROSS-REFERENCE TO RELATED APPLICATIONS

Not applicable.

FIELD OF THE DISCLOSURE

This disclosure relates to turbochargers and more particularly to a turbocharger compressor cover having an outlet that can be convertibly configured to be coupled to either an air hose or a flanged pipe that conveys the compressed air to an intercooler before it is conveyed to the air inlet port of an engine.

BACKGROUND OF THE DISCLOSURE

Turbochargers are forced induction devices used to increase the flow of fresh air into the combustion chamber of an internal combustion engine to increase the efficiency and power of the engine. A turbocharger includes a turbine that is driven by the kinetic energy of the exhaust gas from the engine, and a compressor that is mechanically linked to and driven by the turbine to draw and compress ambient air that is conveyed to the air intake of the engine. Typically, for automotive applications, the pressure increase or boost over ambient pressure is about 6 to 8 pounds per square inch (psig). The discharge outlet from the compressor is typically provided with a smooth circumferential surface to allow the end of a hose to be firmly clamped to the outlet with a T-bolt clamp or worm drive clamp, or a flanged end to allow a pipe to be firmly secured to the discharge outlet using a V-band clamp.

There are commercially available kits for converting a discharge outlet of a turbocharger compressor from one having a smooth circumferential surface to one having a flanged end. Such kits have generally been comprised of flanged fittings that can be welded to the discharge outlet of the turbocharger compressor to facilitate securement to a flanged pipe using a V-band clamp. It is also possible to cut off the flanged end of a discharge outlet of a turbocharger compressor to facilitate attachment of a hose using a T-bolt or worm drive clamp hose clamp. However, it has not been possible to easily switch back and forth between a hose clamp connection and a V-band clamp connection. However, such convertibility is desired by certain motor sports enthusiasts.

SUMMARY OF THE DISCLOSURE

In accordance with certain aspects of this disclosure, a turbocharger housing component has a discharge outlet that has a tubular configuration that extends generally tangentially from a peripheral portion of the turbocharger housing component, wherein the discharge outlet has an externally threaded section adjacent an end of the discharge outlet. The threaded section allows the compressor housing to be easily converted between a configuration in which a hose clamp (e.g., a T-bolt clamp or worm drive clamp) can be used for securing a hose to the discharge outlet, and a configuration in which an internally threaded flanged fitting can be coupled to the end of the discharge outlet to allow use of a V-band clamp to secure a flanged pipe to the discharge outlet. This arrangement allows greater flexibility during installation of parts, modifications, maintenance and repairs of a vehicle employing a turbocharger, such as modifications or repairs to the exhaust system.

DETAILED DESCRIPTION

Figure 1:
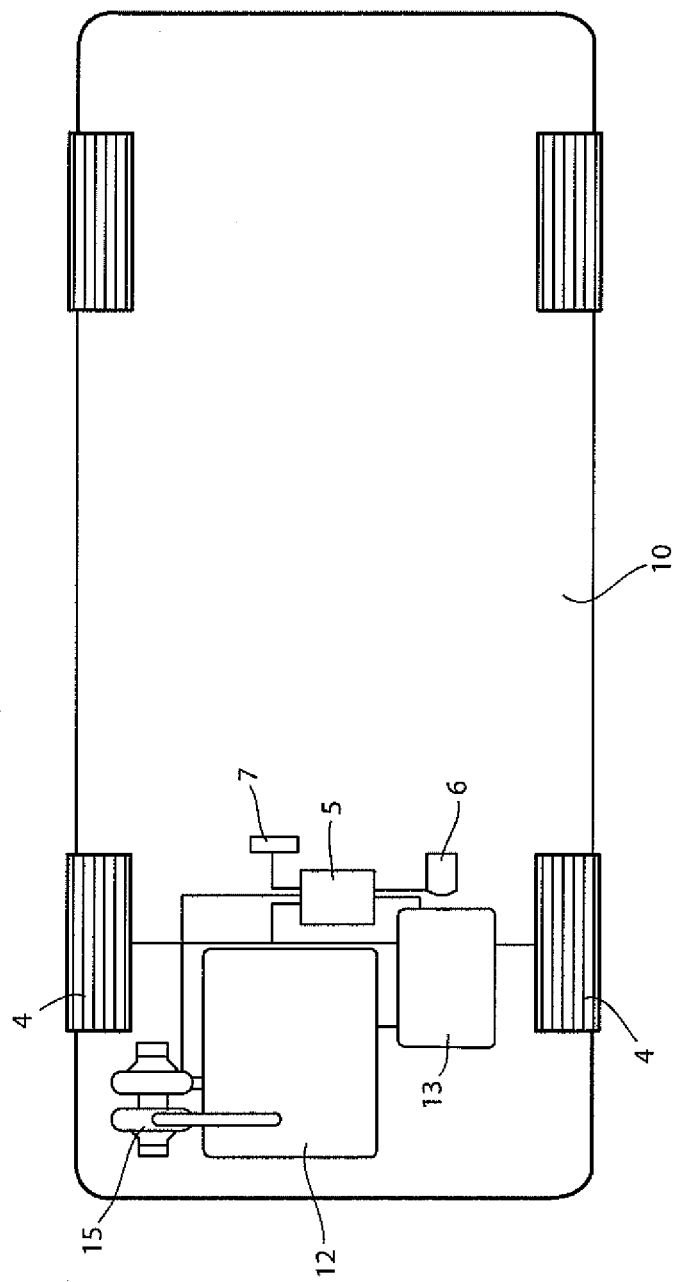
FIG. 1 is a schematic representation of a vehicle having an internal combustion engine and a turbocharger in accordance with this disclosure.

Shown in FIG. 1 is a schematic illustration of a vehicle 10 having an internal combustion engine 12 mechanically linked to a transmission 13 that drives wheels 4. A turbocharger 15 is provided to increase the efficiency of and/or the power from the engine 12.

Figure 2:
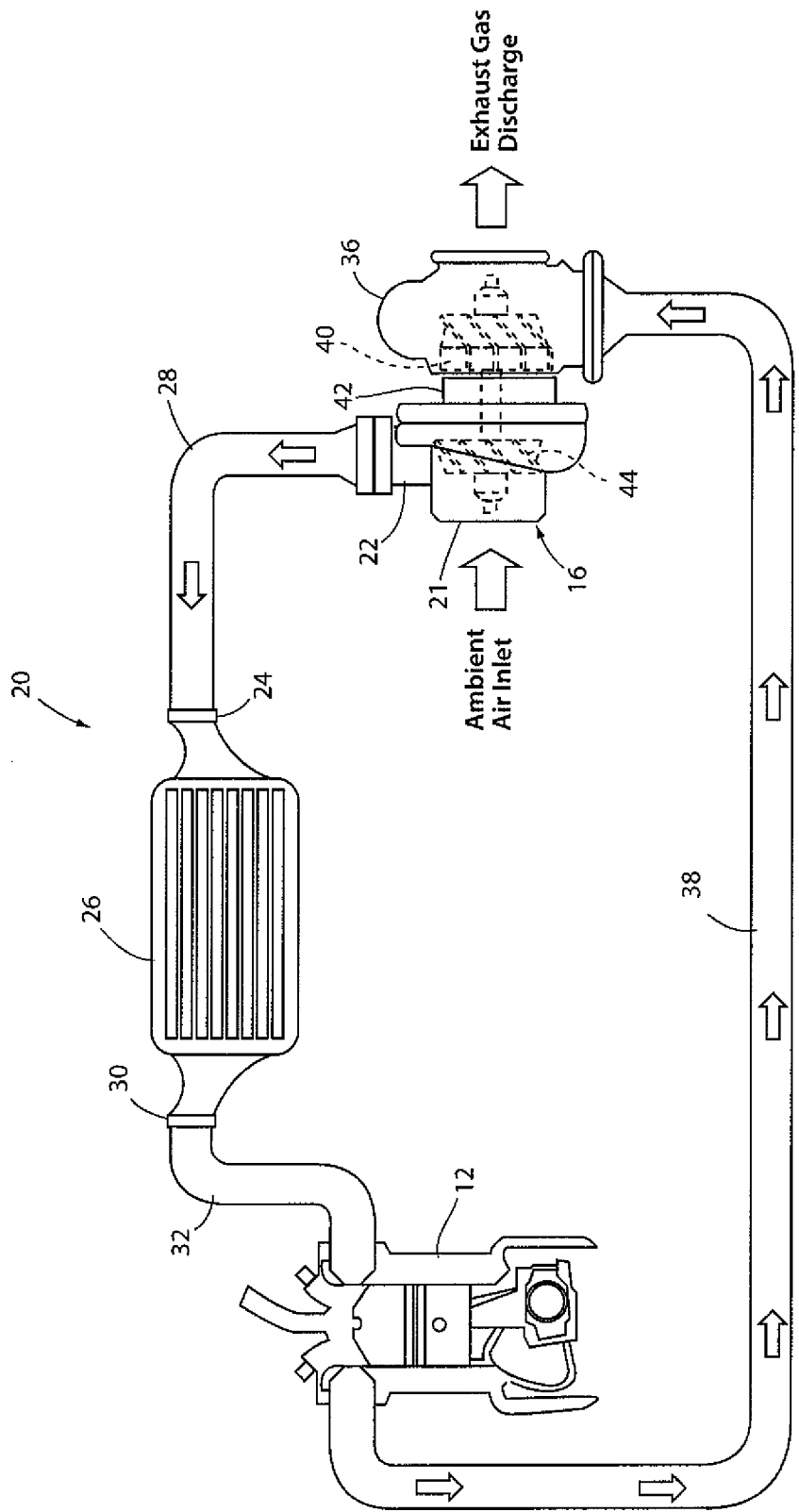
FIG. 2 is a schematic representation of a turbocharged internal combustion engine in accordance with this disclosure.

A turbocharger system 20 is shown in FIG. 2. The system 20 includes turbocharger 15 which includes a compressor 16 that draws ambient air into inlet 21 and discharges compressed air from discharge outlet 22. The compressed air from discharge outlet 22 is conveyed to an air cooler inlet port 24 of an air cooler 26 via pipe 28. Air flows over fins of the cooler 26 as the vehicle moves, cooling the compressed air before it exits cooler 26 from cooler outlet port 30 and is conveyed to an air intake manifold of engine 12 via pipe 32. Combustion products exhausted from engine 12 flow to a turbine 36 via a pipe 38. The exhaust gases turn a turbine wheel 40 that is connected with a shaft 42 that drives a compressor wheel 44.

Figure 3:
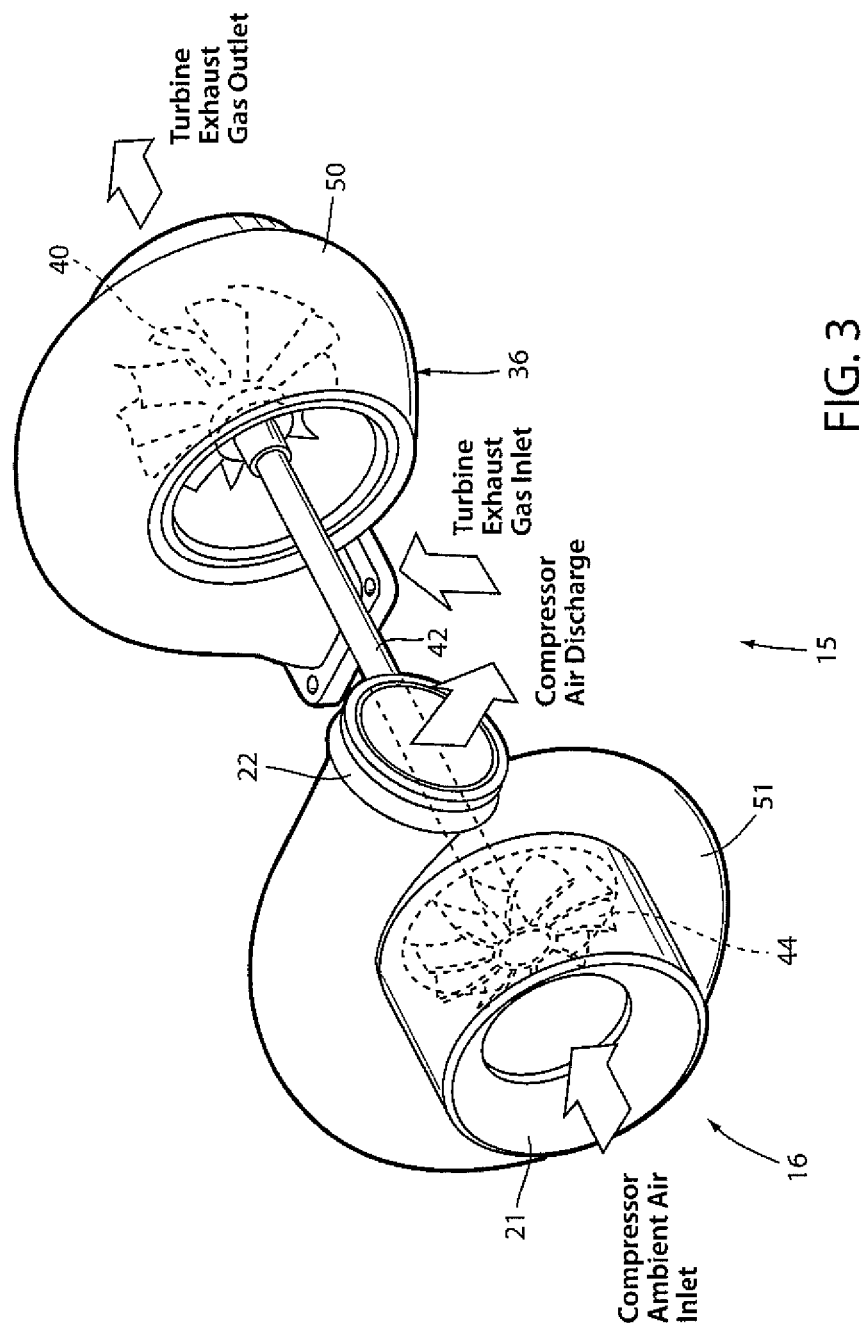
FIG. 3 is a perspective view of a turbocharger with portions broken away to show internal components.

Details of turbocharger 15 are shown in FIG. 3. Each of compressor 16 and turbine 36 have a housing 50 and 51, respectively, that define the inlets and outlets for air and combustion products, respectively.

Figure 4:
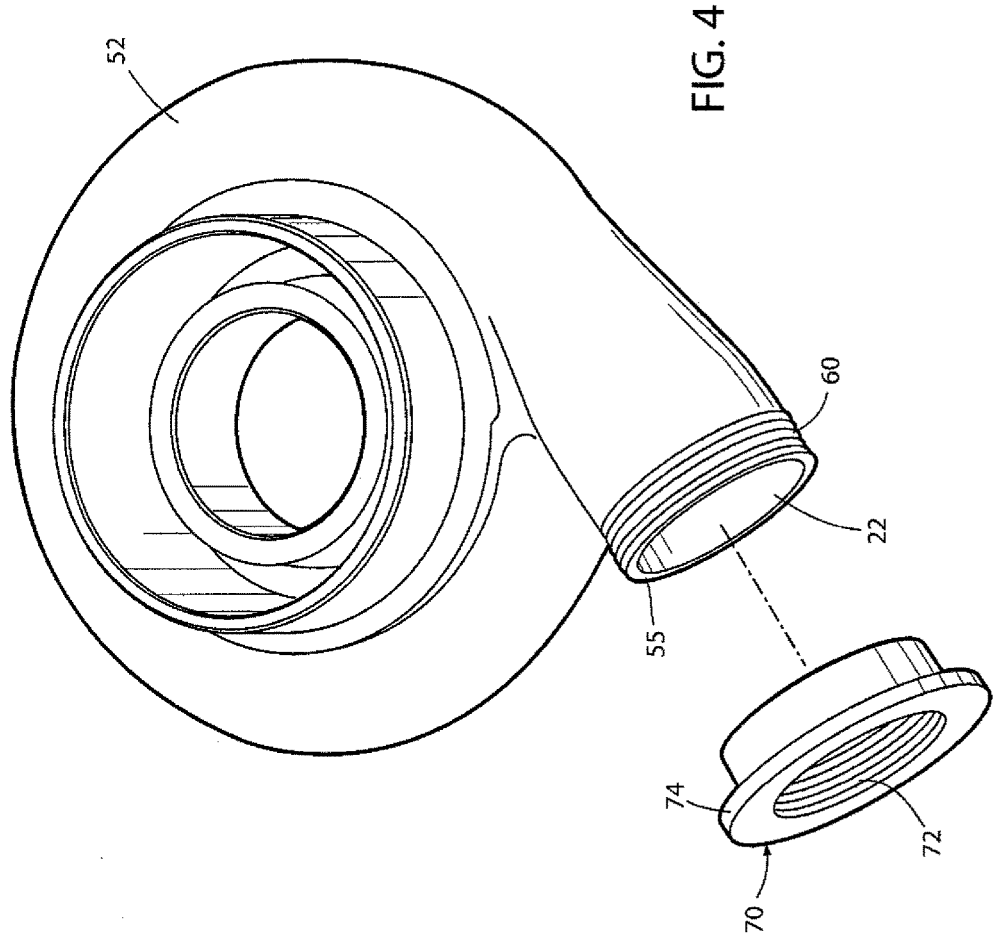
FIG. 4 is a top view of a compressor housing component for a turbocharger in accordance with this disclosure.

FIG. 4 is a top view of a cover component 52 of housing 50. The housing cover 52 defines a compressed air discharge outlet 22 that is a tubular-shaped structure that projects outwardly, generally tangentially from a peripheral portion of housing cover component 52. Adjacent the distal end 55 of discharge outlet 22 is a threaded section 60 adapted to receive a flanged, internally threaded fitting 70 having internal threads 72 adapted to engage external threads 60 on discharge outlet 22, and a flange portion 74.

Figure 5:
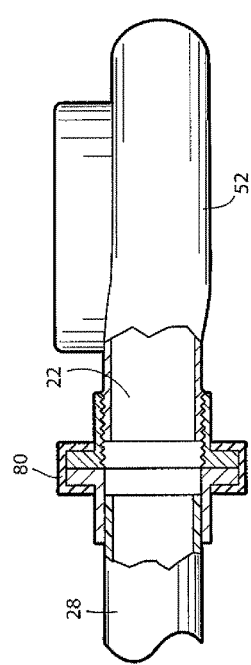
FIG. 5 shows a pipe clamped to a fitting threaded onto the discharge outlet of the turbocharger compressor using a V-band clamp.
Figure 6:
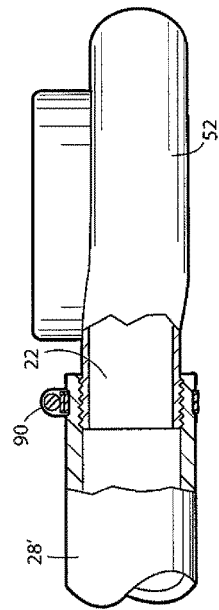
FIG. 6 shows a hose clamped to the discharge outlet of the turbocharger compressor using a hose clamp.

As shown in FIG. 5, a V-band clamp 80 can be used to secure pipe 28 to outlet 22 of compressor housing component 52 if desired. Alternatively, as shown in FIG. 6, a hose 28' can be secured to outlet 22 using a hose clamp 90.

While the present invention is described herein with reference to illustrated embodiments, it should be understood that the invention is not limited hereto. Those having ordinary skill in the art and access to the teachings herein will recognize additional modifications and embodiments within the scope thereof. Therefore, the present invention is limited only by the claims attached herein.

What is claimed is:

1. A turbocharger comprising:
a turbine;
a compressor connected to the turbine;
the compressor having a turbocharger compressor housing having a discharge outlet;
the discharge outlet comprising a tubular portion extending tangentially from a peripheral portion of the turbocharger compressor housing and having an externally threaded section threadingly engaged to a flanged internally threaded fitting adjacent an end of the discharge outlet or engaged with a hose such that the external threads of the discharge outlet bite into the inside surface of the hose.

2. The turbocharger of claim 1, wherein the internally threaded flanged fitting is threadingly engaged with the externally threaded section of the discharge outlet.

3. A vehicle on which is mounted a turbocharger and an internal combustion engine, the turbocharger including:
a turbine for receiving exhaust gases from the internal combustion engine and transforming kinetic energy of the exhaust gases into mechanical work;
a mechanical linkage for using the mechanical work to drive a compressor wheel disposed in a compressor housing;
the compressor housing comprising:
a discharge outlet for conveying compressed air to an air intake of the internal combustion engine;
the discharge outlet defined by a tubular portion which extends tangentially from a peripheral portion of the turbocharger compressor housing;
wherein the discharge outlet has an externally threaded section threadingly engaged to a flanged internally threaded fitting adjacent an end of the discharge outlet or engaged with a hose such that the external threads of the discharge outlet bite into the inside surface of the hose.

4. The vehicle of claim 3, wherein the internally threaded flanged fitting threadingly engages the externally threaded section of the discharge outlet.

5. The vehicle of claim 4, further comprising a flanged conduit held to the discharge outlet by a V-band clamp.

6. The vehicle of claim 3, further comprising the hose held to the discharge outlet by a hose clamp disposed over an end section of the hose that is disposed over the externally threaded section of the discharge outlet such that the external threads of the discharge outlet bite into the inside surface of the hose.

* * * * *